(12) United States Patent
Kuramoto (10) Patent No.: US 8,490,570 B2
(45) Date of Patent: Jul. 23, 2013

(54) PRECISION APPARATUS USING LOW THERMAL EXPANSION COMPONENT

(75) Inventor: Kenji Kuramoto, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 354 days.

(21) Appl. No.: 13/013,362

(22) Filed: Jan. 25, 2011

(65) Prior Publication Data

US 2011/0203511 A1    Aug. 25, 2011

(30) Foreign Application Priority Data

Feb. 25, 2010  (JP) ................. 2010-040053

(51) Int. Cl.
*G01K 11/12* (2006.01)
*G01K 3/00* (2006.01)
*G01P 15/13* (2006.01)

(52) U.S. Cl.
USPC ....... 116/216; 374/106; 374/161; 374/E3.004

(58) Field of Classification Search
USPC .................. 116/216; 374/102, 104, 106, 161, 374/162; 148/511
See application file for complete search history.

(56) References Cited

U.S. PATENT DOCUMENTS

| 3,182,507 A * | 5/1965 | Rogen ........................... 374/102 |
| 4,198,679 A * | 4/1980 | Fainzilberg .................. 702/136 |
| 5,088,825 A | 2/1992 | Derry et al. |
| 2009/0120106 A1* | 5/2009 | Chin ............................. 62/49.1 |
| 2012/0033707 A1* | 2/2012 | Sloan ............................ 374/102 |
| 2013/0008567 A1* | 1/2013 | Katsumata ..................... 148/511 |

FOREIGN PATENT DOCUMENTS

| JP | 2000-160385 | 6/2000 |
| JP | 2001-011580 | 1/2001 |
| JP | 2001-124715 | 5/2001 |
| JP | 2006010527 A * | 1/2006 |
| JP | 2008-197066 | 8/2008 |
| SU | 409124 A * | 4/1974 |
| SU | 1224615 A * | 4/1986 |
| WO | WO 8806728 A1 * | 9/1988 |

* cited by examiner

*Primary Examiner* — R. A. Smith
(74) *Attorney, Agent, or Firm* — David N. Lathrop (57) ABSTRACT

A low temperature history indication plate 31 made of a low thermal expansion material used within an apparatus is provided on the outer surface of the apparatus. A surface of the low temperature history indication plate 31 is mirror polished. Simply by observing the low temperature history indication plate 31, it can be determined whether or not martensitic transformation has occurred.

4 Claims, 6 Drawing Sheets

PRECISION APPARATUS USING LOW THERMAL EXPANSION COMPONENT

TECHNICAL FIELD

The present invention relates to a precision apparatus that uses within the apparatus a part made of a low thermal expansion material that undergoes martensitic transformation at a low temperature.

BACKGROUND ART

In some precision apparatuses such as precision machining equipment and precision measuring instruments, a material called Super Invar (32% Ni-5% Co—Fe), for example, which has an extremely small coefficient of thermal expansion, is sometimes used in a component that requires temperature-stable performance in order to reduce deformation and errors due to changes in ambient temperature.

However, when exposed to extremely low temperatures, a Super Invar material undergoes martensitic transformation, which changes the coefficient of thermal expansion of the Super Invar material to impair its original performance. Therefore, care needs to be taken to keep the part made of the Super Invar material from being exposed to extremely low temperatures lower than or equal to the martensitic transformation temperature.

To address the problem of martensitic transformation of such Ni—Co—Fe low thermal expansion materials, Japanese Patent Application Laid-Open No. 2001-11580 (hereinafter referred to as Patent literature 1) proposes an adjustment of components of an alloy to improve the stability of the alloy at low temperatures.

On the other hand, in the event that martensitic transformation occurs in a Super Invar material or other low thermal expansion material that undergoes martensitic transformation used in a precision apparatus, performance degradation or functional failure can occur.

If performance degradation or functional failure occurs, a temperature history, for example, can be used to determine whether or not the degradation or failure has been caused by martensitic transformation. That is, if means for obtaining the temperature history is provided in the precision apparatus, one can determine from the temperature history whether or not martensitic transformation has occurred due to exposure to extremely low temperatures.

Japanese Patent Application Laid-Open No. 2001-124715 describes a transformation observation apparatus including temperature detecting means and high-frequency current detecting means as means for determining whether transformation of metal has occurred or not.

As has been described above, provision of transformation observation equipment or temperature history obtaining means in a precision apparatus allows to readily determine whether performance degradation or functional failure in the apparatus has been caused by martensitic transformation of a low thermal expansion material used in the apparatus.

However, the provision of such transformation observation equipment or temperature history obtaining means adds cost to the precision apparatus, thereby making the precision apparatus expensive. Therefore, such transformation observation equipment or temperature history obtaining means have not commonly been adopted. In addition, transformation cannot be observed and a temperature history cannot be maintained while power is off such as during storage or transportation of the apparatus.

Therefore, it is a common practice that a precision apparatus is disassembled to take out a part made of a low thermal expansion material that might have undergone martensitic transformation and the surface (structure) of the part is observed or the dimensions or the coefficient of thermal expansion of the parts are precisely measured in order to determine whether or not performance degradation or functional failure has been caused by martensitic transformation. Such operation is laborious and time consuming.

DISCLOSURE OF THE INVENTION

In light of the problem described above, an object of the present invention is to provide a precision apparatus in which it can be readily and inexpensively determined whether or not martensitic transformation of a low thermal expansion material used in the apparatus has occurred.

According to a first aspect of the present invention, a precision apparatus that uses within it a low thermal expansion material that undergoes martensitic transformation at low temperature includes, on its outer surface, a low temperature history indication plate made of the same material as the low thermal expansion material. A surface of the low temperature history indication plate is mirror-polished.

According to a second aspect of the present invention, a precision apparatus that uses within it a low thermal expansion material that undergoes martensitic transformation at low temperature includes, on its outer surface, a low temperature history indication plate made of a plurality of materials having different martensitic transformation temperatures. A surface of the low temperature history indication plate is mirror-polished.

EFFECTS OF THE INVENTION

According to the present invention, it can be determined whether or not martensitic transformation of a low thermal expansion material used in an apparatus has occurred, simply by observing a low temperature history indication plate provided on the outer surface of the apparatus. Thus, determination as to whether martensitic transformation has occurred or not can be made in a remarkably simple and inexpensive manner without having to performing disassembly operation, which was previously required.

DETAILED DESCRIPTION OF THE EMBODIMENTS

A configuration of a servo accelerometer, which is an example of a precision apparatus to which the present invention is applied, will be described first.

Figure 1A:
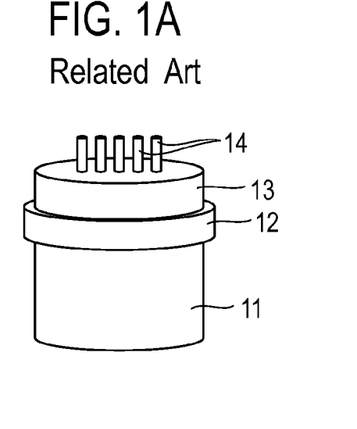
FIG. 1A is an external view of a servo accelerometer, which is one example of a precision apparatus to which the present invention is applied.
Figure 1B:
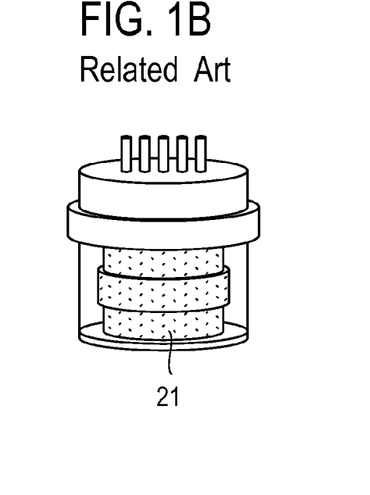
FIG. 1B is a partial perspective view of the servo accelerometer in FIG. 1A.

FIG. 1A illustrates an external view of a servo accelerometer and FIG. 1B is a partial perspective view of the servo accelerometer. The servo accelerometer includes a casing 11, a fitting flange 12, an amplifier unit 13, and external-connection terminals 14. The servo accelerometer also includes yokes 21 constituting magnetic circuits.

Figure 2:
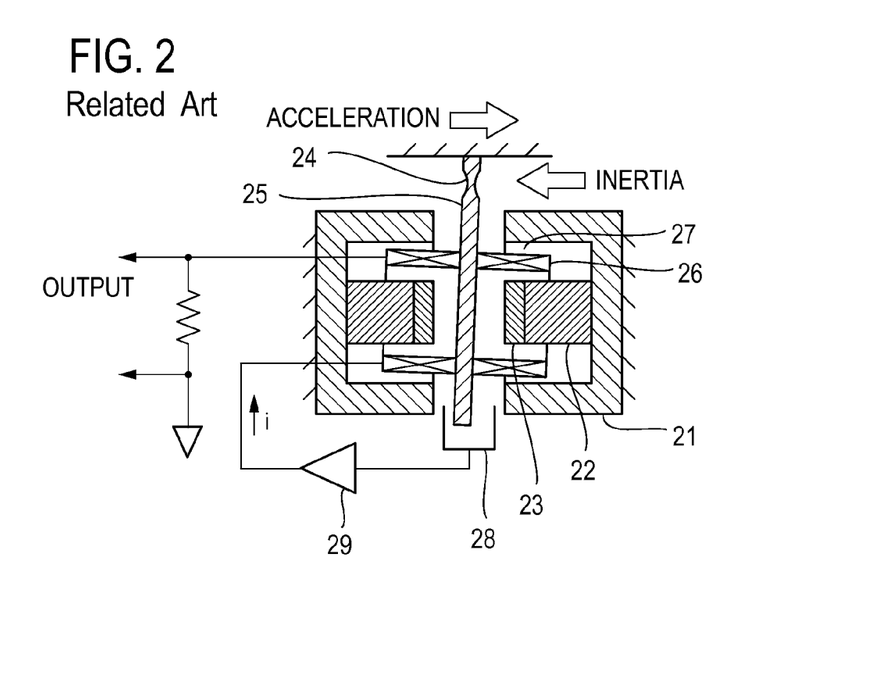
FIG. 2 is a diagram illustrating a principle configuration of the servo accelerometer.

FIG. 2 schematically illustrates a configuration of a main part and principle of the servo accelerometer. Permanent magnets 22 and pole pieces 23 are provided in the yokes 21. The yokes 21, the permanent magnets 22 and the pole pieces 23 make up magnetic circuits. A pendulum 25 supported through a hinge 24 is provided between the two magnetic circuits. Torquer coils 26 are attached to both surfaces of the pendulum 25. Each of the torquer coils 26 is located in a magnetic cavity 27 of the magnetic circuit. A capacitance sensor 28 that detects a change in capacitance to detect a displacement of the pendulum 25 and an amplifier 29 are also depicted in FIG. 2.

The servo accelerometer includes a feedback loop that detects a displacement of the pendulum 25 due to acceleration input with the capacitance sensor 28 and feeds a current (feedback current) "i" to the torquer coils 26 to return the pendulum 25 to the original position. The servo accelerometer operates on the principle that the flowing current "i" is proportional to acceleration.

The servo accelerometer which operates on the principle described above uses quartz glass as the material of the pendulum 25, which is the heart of the accelerometer, and the hinge 24, which supports the pendulum 25, in order to reduce errors due to temperature changes and deterioration by aging. Since quartz glass has a coefficient of thermal expansion of as small as 0.5 ppm/° C. or so, the yokes 21 used in combination is made of an Invar or Super Invar material, which is a magnetic material having a low coefficient of thermal expansion.

Such servo accelerometers are sometimes used for measurement and control in aircrafts that fly at high altitudes or measurement of slopes in oilfield near polar regions, where the servo accelerometers are required to withstand extreme conditions such as a lower limit storage temperature of −40° C. or −70° C. If a lower limit storage temperature of −70° C. is required of a servo accelerometer, the yokes 21 may be made of an Invar material, which has a low martensitic transformation temperature; if a lower limit storage temperature of −40° C. is required of a servo accelerometer, the yokes 21 may be made of a Super Invar material, which has a coefficient of thermal expansion close to that of quartz glass and can deliver high performance.

However, temperature monitoring during storage is often inadequate. In case the yokes 21 are exposed to a temperature lower than a specified lower limit temperature, martensitic transformation will occur in the yokes 21.

A configuration of an embodiment of a precision apparatus according to the present invention will be described below with respect to a servo accelerometer as an example. The assumption here is that the yokes 21 making up magnetic circuits of the servo accelerometer are made of a Super Invar material.

Figure 3:
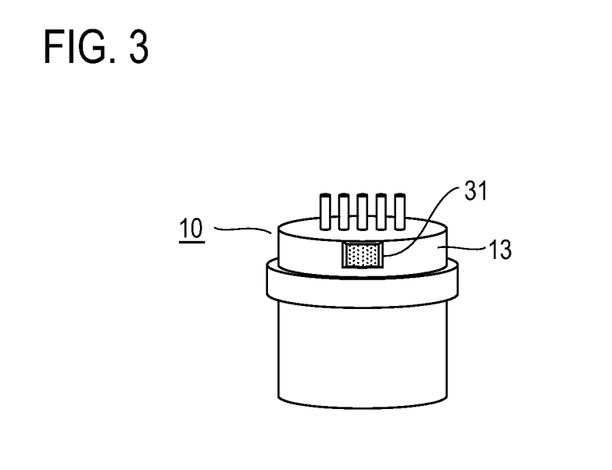
FIG. 3 is a perspective view illustrating an embodiment of the present invention.
Figure 4A:
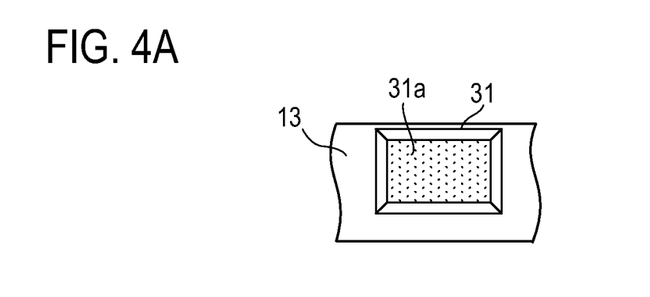
FIG. 4A is a front view of a low temperature history indication plate in FIG. 3.
Figure 4B:
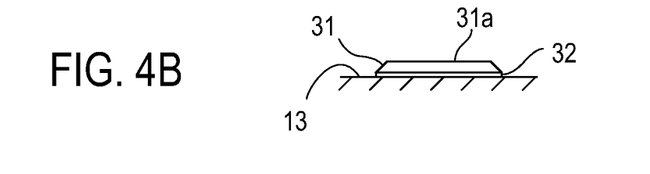
FIG. 4B is a diagram illustrating how the low temperature history indication plate in FIG. 3 is attached.

As illustrated in FIG. 3, the servo accelerometer 10 of the example includes a low temperature history indication plate 31 on its outer surface. The low temperature history indication plate 31 is attached to the outer surface of an amplifier unit 13. The low temperature history indication plate 31 in the example is rectangular in shape, made of the same Super Invar material as the yokes 21, and is bonded with a bond 32 as illustrated in the plan view in FIG. 4A and the cross-sectional view in FIG. 4B. The surface 31a of the low temperature history indication plate 31 is mirror-polished.

According to the example, if the ambient temperature decreases to the temperature at which martensitic transformation occurs in the Super Invar material, a change in the structure (appearance of a acicular pattern) that is attributed to martensitic transformation appears in the surface 31a of the low temperature history indication plate 31. One can consider that martensitic transformation is likely to have also occurred in the Super Invar material used inside the servo accelerometer 10.

Figure 5A:
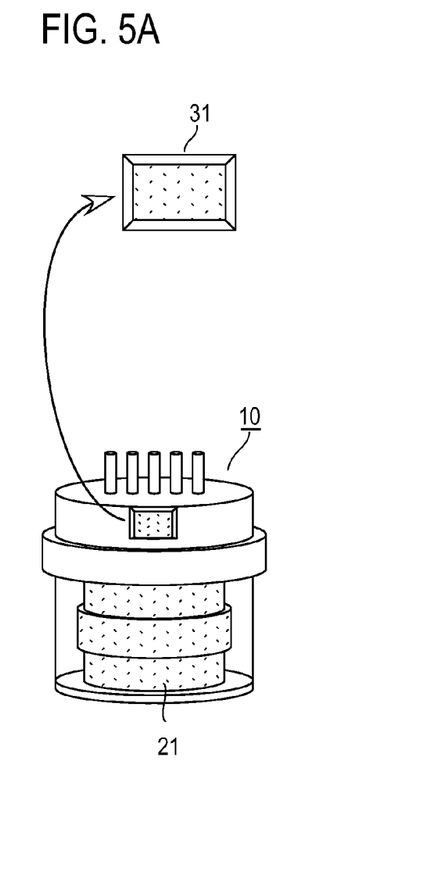
FIG. 5A is a diagram schematically illustrating the surfaces of a yoke and the low temperature history indication plate before occurrence of martensitic transformation.
Figure 5B:
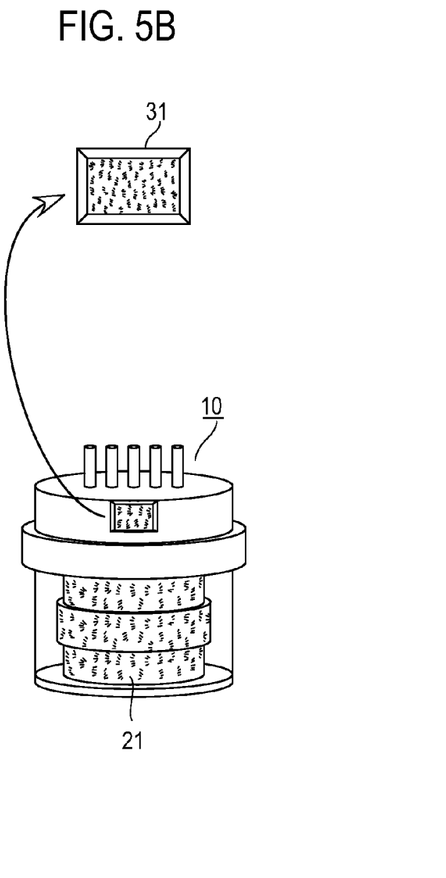
FIG. 5B is a diagram schematically illustrating the surfaces of the yoke and the low temperature history indication plate after occurrence of martensitic transformation.

FIGS. 5A and 5B schematically illustrate a change in the appearance of the yokes 21 and the low temperature history indication plate 31 that is attributed to martensitic transformation. FIG. 5A illustrates an austenite state before the Super Invar material has been exposed to an extremely low temperature and FIG. 5B illustrates martensitic transformation that has occurred after exposure to the extremely low temperature.

Conventionally, etching or other process is often performed before metallographic observation. However, since the surface 31a of the low temperature history indication plate 31 was polished to a mirror state beforehand, the acicular structure caused by martensitic transformation in the austenite structure can be observed without needing to perform a process such as etching. The observation can be performed with the naked eye or a low-power magnifier.

As has been described above, the low temperature history indication plate 31 is simply attached to the outer surface of the servo accelerometer 10 in the example. By observing the low temperature history indication plate 31, it can be determined whether martensitic transformation has occurred or not. Accordingly, if performance degradation or functional failure occurs in the servo accelerometer, determination can be made as to whether the degradation or failure has been caused by martensitic transformation of the Super Invar material used within the servo accelerator, without needing to disassemble the servo accelerator and without needing to use a special facility or power supply. Thus, according to the example, it can be remarkably simply and inexpensively determined whether or not martensitic transformation has occurred during storage or transportation.

Since occurrence of martensitic transformation can be known instantly in this way, actions such as a review of the conditions of storage and use, for example, can be taken quickly.

While the low temperature history indication plate 31 is bonded in the example described above, the low temperature history indication plate 31 may be attached by welding, for example.

Figure 6A:
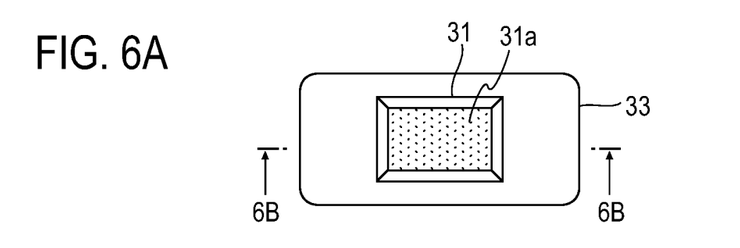
FIG. 6A is a plan view illustrating another example of how the low temperature history indication plate is attached.
Figure 6B:
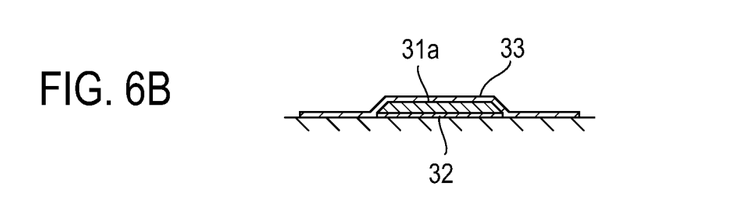
FIG. 6B is a cross-sectional view taken along line 6B-6B in FIG. 6A.

FIGS. 6A and 6B illustrate an example of a low temperature history indication plate 31 having a surface 31a coated with a transparent resin 33. The transparent resin coating can prevent corrosion and damage of the mirror-polished surface 31a, thereby the determination capability can be maintained for a long period of time.

Figure 7A:
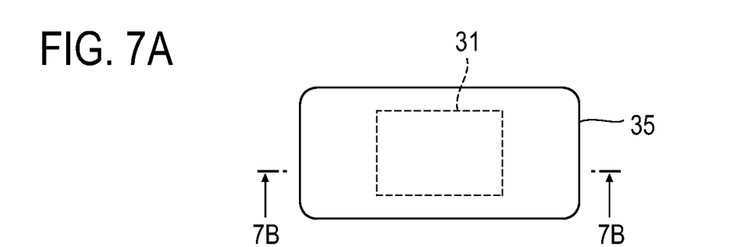
FIG. 7A is a plan view illustrating a yet another example of how the low temperature history indication plate is attached.
Figure 7B:
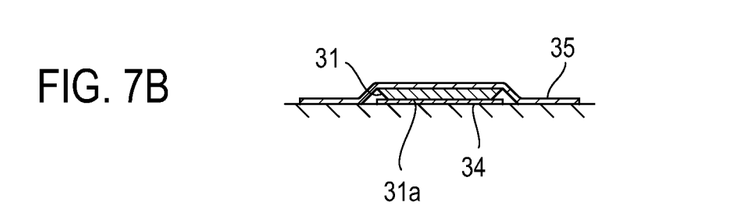
FIG. 7B is a cross-sectional view taken along line 7B-7B in FIG. 7A.

In another example, a low temperature history indication plate 31 is flipped over so that its mirror-polished surface 31a faces the outer surface of a servo accelerometer, and then is attached as illustrated in FIGS. 7A and 7B. This attachment can protect the surface 31a from external influences to prevent damage and corrosion of the surface 31a. The low temperature history indication plate 31 includes a protective sheet 34 that protects the surface 31a and a pressure-sensitive adhesive sheet 35 that fixes the low temperature history indication plate 31. The pressure-sensitive adhesive sheet 35 can be peeled off and the low temperature history indication plate 31 can be removed to observe its surface 31a.

Both sides of the low temperature history indication plate 31 may be mirror-polished and the low temperature history indication plate 31 may be attached to the outer surface of the servo accelerometer with a pressure-sensitive adhesive. In that case, if one of the sides (surface 31a) becomes corroded, the other surface attached with the pressure-sensitive adhesive can be observed for determination because the surface is protected.

Figure 8A:
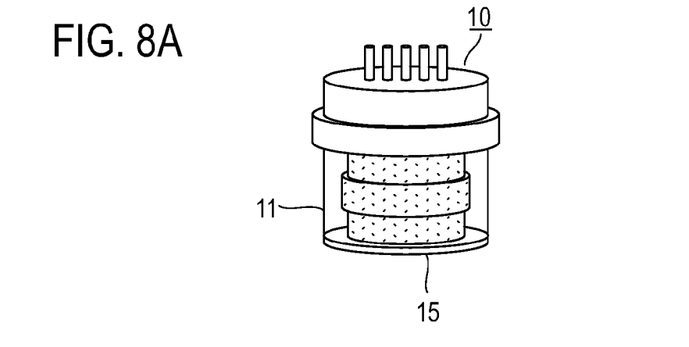
FIG. 8A is a partial perspective diagram illustrating an example in which the low temperature history indication plate is used in a portion of a casing of a servo accelerometer.
Figure 8B:
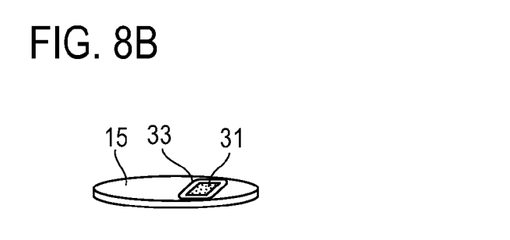
FIG. 8B is a diagram illustrating an example of how the low temperature history indication plate in FIG. 8A is attached.
Figure 8C:
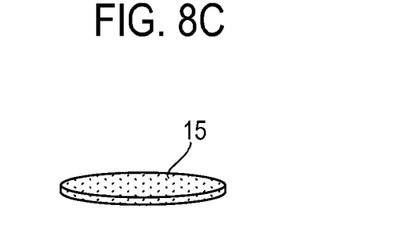
FIG. 8C is an exemplary implementation of the low temperature history indication plate in FIG. 8A.

FIGS. 8A, 8B and 8C illustrate other examples of a low temperature history indication plate 31 that can be adopted. The low temperature history indication plates 31 forms part or all of a rating plate 15 of a servo accelerometer 10 (in this example, the bottom plate of the casing 11 is the rating plate 15). The low temperature history indication plate 31 in FIG. 8B is provided in a portion of a rating plate 15 and is mirror-polished and coated with a transparent resin 33. In the example in FIG. 8C, at least a portion of the rating plate 15 that forms the low temperature history indication plate 31 is mirror-polished and coated with a transparent resin (not shown).

While the low temperature history indication plates 31 in the examples described above are made of the same Super Invar material as the yoke 21, a low temperature history indication plate may be made of multiple materials having different martensitic transformation temperatures because martensitic transformation temperature can be changed by adjusting the contents of Ni—Co—Fe as described in Patent literature 1, for example.

Figure 9:
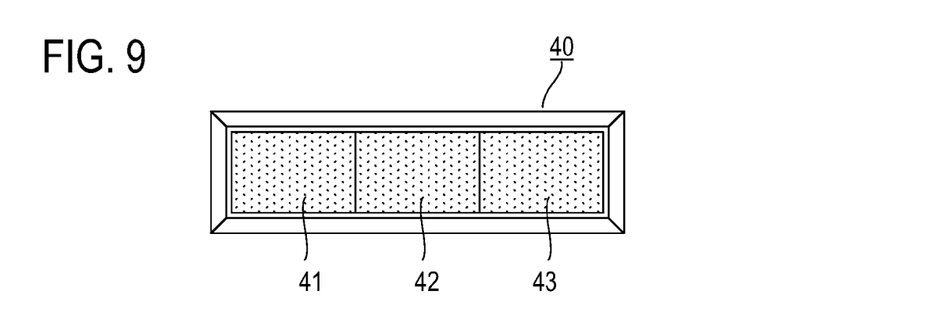
FIG. 9 is a front view illustrating another exemplary configuration of the low temperature history indication plate.

FIG. 9 illustrates a low temperature history indication plate 40 formed in that way. In this example, the low temperature history indication plate 40 is made of three materials 41, 42 and 43 that have different martensitic transformation temperatures and are arranged side by side. The three materials 41, 42 and 43 have martensitic transformation temperatures $Tm1$, $Tm2$ and $Tm3$, respectively, where $Tm1 > Tm2 > Tm3$. The material 42 in the example is the same Super Invar material as that of the yoke 21.

With this configuration, determination can be made as to whether martensitic transformation has occurred in the yokes 21 and, in addition, a change in ambient temperature (low temperature to which the yoke 21 has been exposed) can be estimated. Furthermore, determination as to whether or not an acicular structure resulting from the martensitic transformation has appeared can be readily made from comparison among the surfaces of the materials 41, 42 and 43. Here, $Tm1$ and $Tm3$ are in the following relationship, for example.

$$Tm1 \approx Tm2 + 30 (°C.)$$

$$Tm3 \approx Tm2 - 30 (°C.)$$

Figure 10:
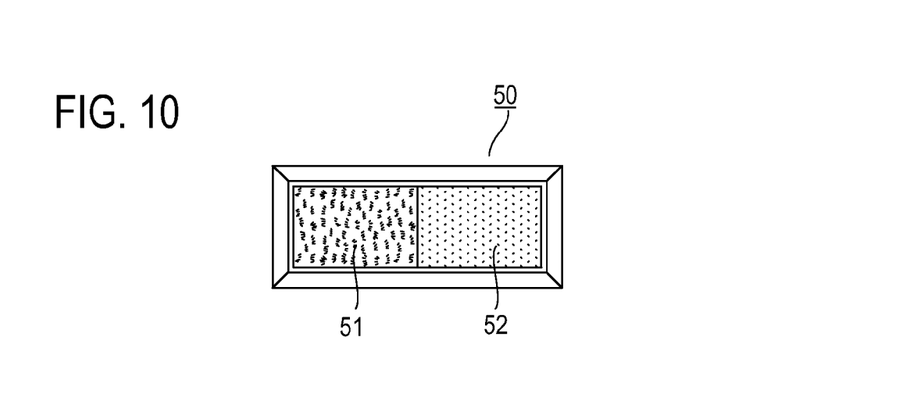
FIG. 10 is a front view illustrating a yet another exemplary configuration of the low temperature history indication plate.

FIG. 10 illustrates a low temperature history indication plate 50 in which a reference sample 51 that has been exposed to a low temperature to induce martensitic transformation beforehand is provided alongside a material 52 in which martensitic transformation has not occurred. The reference sample 51 provides a reference indicating what pattern of acicular structure will appear and facilitates determination as to whether martensitic transformation has occurred or not.

An embodiment in which the present invention has been applied to a servo accelerometer has been described above. An embodiment of another precision apparatus that uses a low thermal expansion component will be described below.

Figure 11:
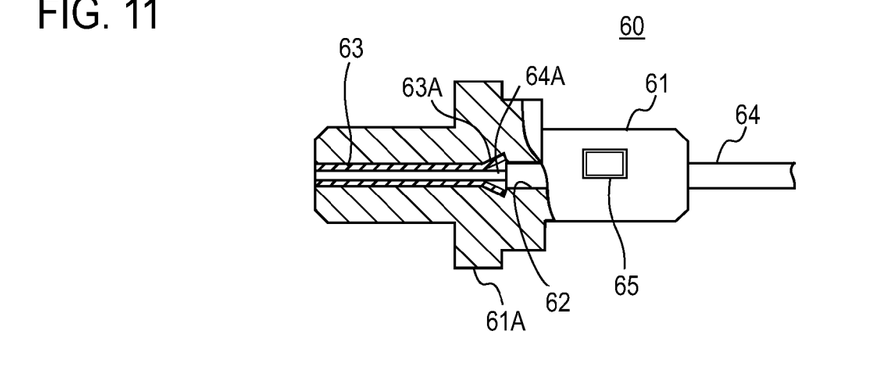
FIG. 11 is a partial cross-sectional view of a ferrule to which the present invention has been applied.

FIG. 11 illustrates a partial cross section of a ferrule used in a connector for optical fiber. The ferrule 60 includes a cylindrical body 61 made of resin and a flange 61A that is integral with a middle part of the cylindrical body 61 along the length of the cylindrical body 61 and has a larger diameter than the cylindrical body 61. A guide hole 62 that passes through the shaft axis of the cylindrical body 61 is formed in the cylindrical body 61. A metal pipe 63 is fit into the guide hole 62. The metal pipe 63 extends from an end of the cylindrical body 61 to a middle part of the cylindrical body 61 and has a taper portion 63A that broadens toward a back end. An optical fiber 64 is inserted in the guide hole 62 through the back end of the cylindrical body 61. The optical fiber core 64A of the optical fiber 64 extends to the end of the cylindrical body 61 through the metal pipe 63.

The metal pipe 63 is made of Invar or Super Invar, which is a low thermal expansion material, in order to increase the positional accuracy of the optical fiber core 64A with respect to the shaft axis. Such a ferrule is described in Japanese Patent Application Laid-Open No. 2000-160385, for example. According to the present invention, a low temperature history indication plate 65 is bonded to the surface of the rear part, for example, of the cylindrical body 61 that is close to the flange 61A. If martensitic transformation occurs in the Super Invar material of the metal pipe 63, the fact can be known by observing the low temperature history indication plate 65.

Figure 12:
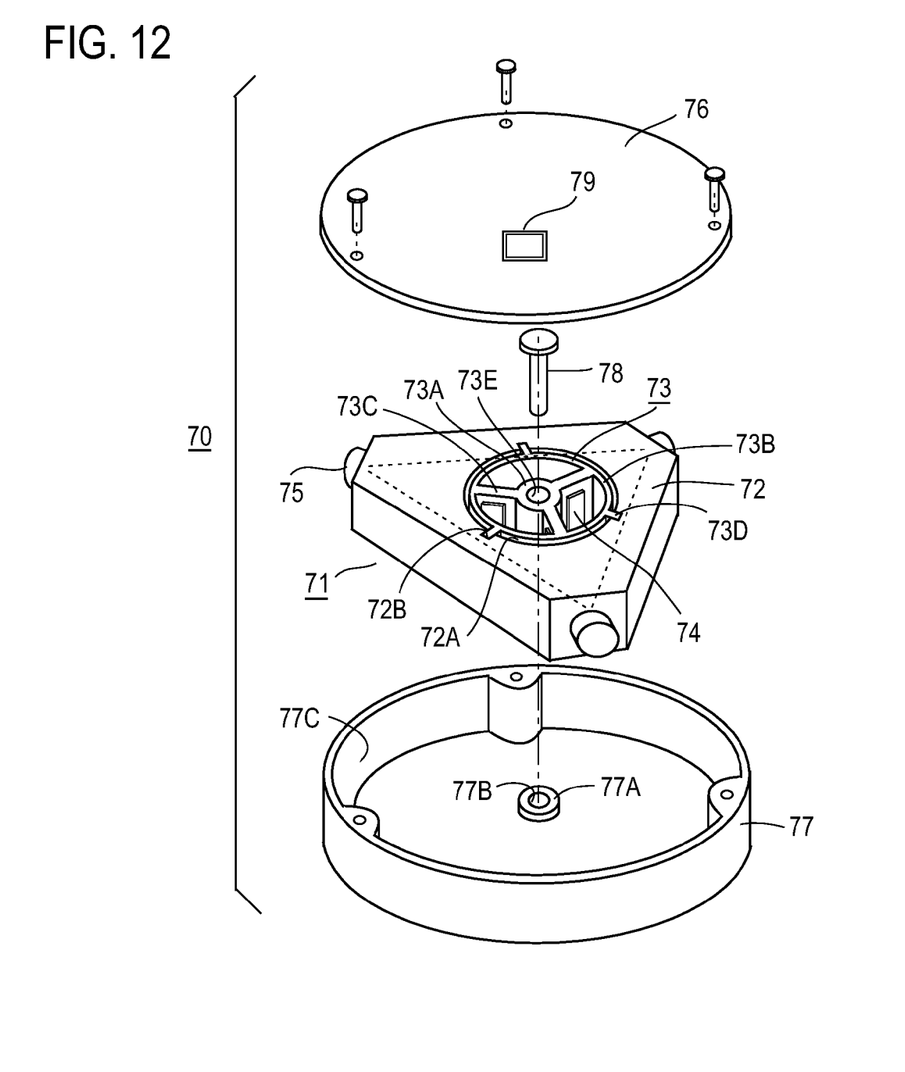
FIG. 12 is an exploded perspective view of a ring laser gyroscope to which the present invention has been applied.

FIG. 12 illustrates an embodiment in which the present invention has been applied to a ring laser gyroscope. A ring laser gyroscope 70 includes a gyroscope main body 71, a casing 77 housing the gyroscope main body 71, and a cover 76 that covers the top of the casing 77. The gyroscope main body 71 includes a low-thermal-expansion glass body 72 which has a polygonal solid shape, here a generally triangular solid shape, a dither suspension 73 made of a Super Invar material, provided inside a cylindrical housing hole 72A that is provided in the central portion of the low-thermal-expansion glass body 72 and passes through the low-thermal-expansion glass body 72, and corner mirrors 75, each being provided at each of the vertices of the triangular, low-thermal-expansion glass body 72. Although not depicted, a space is formed inside the low-thermal-expansion glass body 72, excluding the housing hole 72A. The reflecting surface of each of the corner mirrors 75 at the vertices of the triangle is located in the space to form a light path in the space in which light is reflected by the reflecting surfaces of the corner mirrors 75 and circulates as indicated by the dashed line in FIG. 12.

The dither suspension 73 includes a cylindrical part 73A, a sleeve 73B surrounding the cylindrical part 73A, multiple arm plates 73C that extend radially between the cylindrical part 73A and the sleeve 73B and are coupled with each other, and limbs 73D radially protruding outward from the outer surface of the sleeve 73B. The limbs 73D are fit into grooves 72B formed in the inner wall of the housing hole 72A. Piezoelectric elements 74 are fixed on both sides of each arm plate 73C. The gyroscope main body 71 is housed in a housing space 77C in the casing 77. An annular protrusion 77A formed in the center of the bottom of the housing space 77C supports one end of the cylindrical part 73A of the dither suspension 73. A fixing pin 78 is fixed in a fixing hole 77B of the annular protrusion 77A through a shaft hole 73E formed in the cylindrical part 73A to fix the cylindrical part 73A to the annular protrusion 77A. Thus, the low-thermal-expansion glass body 72 of the gyroscope main body 71 is supported on the annular protrusion 77A of the casing 77 by the cylindrical part 73A through the limbs 73D, the sleeve 73B and the arm plates 73C of the dither suspension 73. In this state, the cover 76 covers the opening of the casing 77 and is fixed on the casing 77 with screws.

The space in the low-thermal-expansion glass body 72 including the light path is filled with a laser medium. Electrodes, not depicted, discharge high-voltage electricity in the space to generate plasma. Two laser beams traversing clockwise and counterclockwise are produced by reflection by the mirrors. When the casing 77 is rotated about its central axis (input angular velocity is applied to the casing 77), the angular velocity is provided to the gyroscope main body 71, an optical path difference results, and the optical path difference results in a difference in oscillating frequency between the two laser beams. The frequency difference can be detected as an optical interference pattern to detect the input angular velocity.

The ring laser gyroscope 70 enters a state (a dead band of the gyroscope) in which the ring laser gyroscope cannot detect input angular velocities lower than a certain value. The phenomenon is known as lock-in. To prevent the lock-in, the piezoelectric elements 74 are attached on the arm plates 73C to apply dither angular oscillation about the axis. Such a ring laser gyroscope is disclosed in U.S. Pat. No. 5,088,825, for example. Japanese Patent Application Laid-Open No. 2008-197066 discloses the use of a dither suspension 73 made of Inver or Super Inver that has a coefficient of thermal expansion close to that of the low-thermal-expansion glass body 72 of the gyroscope main body 71.

According to the present embodiment, a low temperature history indication plate 79 which indicates a possibility of transformation of the dither suspension 73 made of a low thermal expansion material to martensite is attached to the top surface of the cover 76.

While examples of precision apparatuses that use components made of Super Invar materials have been described above, the present invention is also applicable to various other precision apparatuses that use low thermal expansion materials that undergo martensitic transformation when being exposed to extremely low temperatures. Furthermore, a low temperature history indication plate that measures as small as several millimeters per side enables visual identification of martensitic transformation. Therefore, the low temperature history indication plate can be attached to a small apparatus as well.

If the low temperature history indication plate is made of a material having a martensitic transformation temperature somewhat higher than the martensitic transformation temperature of a low thermal expansion material used in a precision apparatus, for example occurrence of martensitic transformation can be identified well in advance.

What is claimed is:

1. A precision apparatus that uses within the apparatus a low thermal expansion material that undergoes martensitic transformation at low temperature, comprising on an outer surface of the apparatus:
    a low temperature history indication plate made of the same material as the low thermal expansion material, a surface of the low temperature history indication plate being mirror-polished so that change in a material structure of the low temperature history indication plate causes a change of appearance of the mirror-polished surface.

2. A precision apparatus that uses within the apparatus a low thermal expansion material that undergoes martensitic transformation at low temperature, comprising on an outer surface of the apparatus:
    a low temperature history indication plate made of a plurality of materials having different martensitic transformation temperatures, a surface of the low temperature history indication plate being mirror-polished so that change in a material structure of the low temperature history indication plate causes a change of appearance of the mirror-polished surface.

3. The precision apparatus according to claim 1 or 2, wherein the mirror-polished surface is coated with a transparent resin.

4. The precision apparatus according to claim 1 or 2, wherein the low temperature history indication plate is attached to the outer surface of the apparatus in such a manner that the mirror-polished surface of the low temperature history indication plate faces the outer surface of the apparatus.

* * * * *